United States Patent
Mostl (10) Patent No.: US 8,117,187 B2
(45) Date of Patent: Feb. 14, 2012

(54) METHOD FOR CONTROLLING A RELATIONAL DATABASE SYSTEM

(75) Inventor: Matthias Mostl, Vienna (AT)

(73) Assignee: Mediareif Moestl & Reif Kommunikations-und Informationstechnologien OEG, Vienna (AT)

( * ) Notice: Subject to any disclaimer, the term of this patent is extended or adjusted under 35 U.S.C. 154(b) by 1419 days.

(21) Appl. No.: 11/553,631

(22) Filed: Oct. 27, 2006

(65) Prior Publication Data

US 2007/0106637 A1    May 10, 2007

Related U.S. Application Data

(60) Provisional application No. 60/731,059, filed on Oct. 28, 2005.

(51) Int. Cl.
*G06F 7/00* (2006.01)
*G06F 17/30* (2006.01)

(52) U.S. Cl. ......... 707/716; 707/769; 707/797; 707/803

(58) Field of Classification Search .................. 707/798, 707/802, 803, 795, 708, 716, 769, 792, 797
See application file for complete search history.

(56) References Cited

U.S. PATENT DOCUMENTS

| | | | |
|---|---|---|---|
| 5,519,859 A | | 5/1996 | Grace |
| 5,600,829 A | | 2/1997 | Tsatalos et al. |
| 5,706,495 A | * | 1/1998 | Chadha et al. ........................ 1/1 |
| 5,797,000 A | * | 8/1998 | Bhattacharya et al. ....... 707/764 |
| 5,930,764 A | * | 7/1999 | Melchione et al. ............. 705/10 |
| 5,930,785 A | | 7/1999 | Lohman et al. |
| 6,240,418 B1 | * | 5/2001 | Shadmon ...................... 707/696 |
| 6,453,325 B1 | * | 9/2002 | Cabrera et al. ......................... 1/1 |
| 6,618,719 B1 | * | 9/2003 | Andrei ................................... 1/1 |

(Continued)

FOREIGN PATENT DOCUMENTS

WO    WO0231625 A2    4/2002

(Continued)

OTHER PUBLICATIONS

Surajit Chaudhuri, An Overview of Query Optimization in Relational Systems, Proceedings of the 17th ACM Sigact-Sigmod-Sigart Symposium on Primciples of Database Systems, Jun. 1, 1998, pp. 34-43, Association for Computing Machinery, Newyork, NY.

*Primary Examiner* — Don Wong
*Assistant Examiner* — Merilyn Nguyen
(74) *Attorney, Agent, or Firm* — Paul and Paul (57) ABSTRACT

A method for controlling a relational database system by executing a database query in a relational database which contains, as an associated data structure, a plurality of data tables interconnected through relations, by using a database language, with a table of the relations being provided. A processable database statement without relation-related operations is created by indicating the data tables to which the processing functions are to be applied and by indicating the order of the selected data tables according to which the processing is to be carried out, and an access path, which concretely states the order of access to the database, is determined by first computing a partial access path, via the table of relations, between each two subsequent, selected data tables on the basis of the relations which exist between the subsequent data tables, and then assembling the access path from all computed partial access paths.

12 Claims, 4 Drawing Sheets

U.S. PATENT DOCUMENTS

| | | |
|---|---|---|
| 6,732,091 B1 | 5/2004 | Middelfart |
| 6,834,287 B1 | 12/2004 | Folk-Williams et al. |
| 7,962,521 B2 * | 6/2011 | Brown et al. ................. 707/791 |
| 2004/0220923 A1 * | 11/2004 | Nica ................................ 707/3 |
| 2004/0220928 A1 | 11/2004 | Evans |
| 2005/0076045 A1 | 4/2005 | Stenslet et al. |

FOREIGN PATENT DOCUMENTS

| | | |
|---|---|---|
| WO | WO02091271 A1 | 11/2002 |
| WO | WO02103573 A1 | 12/2002 |

* cited by examiner

| | | DEPARTMENT_NAMES AS_DEPARTMENTS |
|---|---|---|
| DEPARTMENTS.NAME | | DEPARTMENTS.TITLE AS_DEPARTMENTS.NAME |
| COMPANIES | ZIP_CITIES | WHERE (COMPANIES.ZIP=ZIP_CITIES.ZIP) |
| COMPANIES | CONTACT_PERSONS | WHERE (COMPANIES.COMPANY_ID= =CONTACT_PERSONS.COMPANY#) |
| COMPANIES.e-mail_CONTACT_PERSON# | | SELECT_CONTACT_PERSONS.CONTACT_PERSON _ID_WHERE(CONTACT_PERSONS.IS_e-mail PRIMARY_CONTACT=TRUE) |
| COMPANIES.CITY | | SELECT ZIP_CITIES.CITY WHERE(COMPANIES.ZIP=ZIP_CITIES_ZIP) |
| COMPANIES_ONLY_VIENNA | | WHERE(COMPANIES.CITY="VIENNA") |
| CONTACT_PERSONS | EVENTS | WHERE(CONTACT_PERSONS.CONTACT_PERSON ID=EVENTS.CONTACT_PERSON#) |
| CONTACT_PERSONS | DEPARTMENT_NAMES | WHERE(CONTACT_PERSON.DEPARTMENT_#= = DEPARTMENT_NAMES.DEPARTMENT_ID) |
| INVOICES | INVOICES_LINE_ITEMS | WHERE([INVOICES.INVOICE_ID= = [INVOICES_LINE_ITEMS].INVOICE#) |
| INVOICES_LINE_ITEMS | INVOICES_LINE_ITEMS LINE_ITEM_TITLE | WHERE([INVOICES_LINE_ITEMS].LINE_ITEM#= =[INVOICES_LINE_ITEMS_LINE_ITEM_TITLE]. LINE_ITEM_ID) |

Fig. 5

METHOD FOR CONTROLLING A RELATIONAL DATABASE SYSTEM

CROSS REFERENCE TO RELATED APPLICATIONS

This application claims the benefit of the priority of U.S. Provisional Application for Patent Ser. No. 60/731,059, filed on Oct. 28, 2005, which is incorporated by reference herein in its entirety.

The invention concerns a method for controlling a relational database system by executing a database query in a relational database which contains, as an associated data structure, a plurality of data tables interconnected through relations, by using a database language, with a table of the relations being provided.

The concept of a relational database is characterized by increased user-friendliness, the separation between program and data, the table structure, and the integrity of data through the reduction of redundancies when compared to other databases.

Several attempts have been made to develop languages for database queries based on the model of a relational database, and of these, SQL has proven to be the most useable so far. All other approaches, such as OLAP, OQL and TSQL have meanwhile been integrated into the SQL standard.

In practice, it has proven disadvantageous that queries only refer to a concrete data structure of the actually used database in its current state. Changing the data structure results in immediate changes in the query. The same query for one data structure may therefore look completely different for another data structure.

In many cases, the main element of an SQL query is formed by relation-oriented operations, such as projection, join or selection, or by set-oriented operations, such as union, intersection, and difference of sets. This virtually always implies the use of the formation of at least one Cartesian product of data tables and constraints, employing the available relation information.

The following Example 1 illustrates the influence of the data structure on the formulation of the query.

EXAMPLE 1

Output of all companies based in Vienna, Austria, sorted according to company name, company departments and contact persons Data structure 1:

Relations: companies <->departments <->contact_persons

| | |
|---|---|
| SELECT companies.*, departments.*, contact_persons.* | processing function |
| FROM companies, departments, contact_persons | Cart. product; relation information |
| WHERE (companies.company_ID = departments.company_#) | relation information |
| AND (departments.department_ID = contact_persons.department_#) | relation information |
| AND (companies.city = „Vienna") | processing function |
| ORDER BY companies.name | processing function |

Data structure 2:

Relations: companies <->area_of_business <->departments <->contact_persons

| | |
|---|---|
| SELECT companies.*, departments.*, contact_persons.* | processing function |
| FROM companies, area_of_business, departments, contact_persons | Cart. product; relation information |
| WHERE (companies.c_ID = area_of_business.c_#) | relation information |
| AND (area_of_business.area_ID = departments.area_#) | relation information |
| AND (departments.d_ID = contact_persons.d_#) | processing function |
| ORDER BY companies.name | processing function |

As can be seen, relations depend on the given data structure and must be re-formulated for each database statement, resulting in the dependence on the data structure.

The aim of the invention is to create a method which eliminates the dependence of the database statement on the data structure and achieves simplifications for the user.

Another aim is to allow the reduction of the length of notation which considerably increases the clarity of queries.

It is a further aim of the invention to provide a method as mentioned above which allows the simultaneous access to different existing data structures by means of statements which have been written for only one specific data structure. According to the invention, this is achieved by creating a processable database statement without relation-related operations by indicating the data tables to which the processing functions are to be applied and by indicating the order of the selected data tables according to which the processing is to be carried out, determining an access path which concretely states the order of access to the database by first computing a partial access path, via the table of relations, between each two subsequent, selected data tables on the basis of the relations which exist between the subsequent data tables, and then assembling the access path from all computed partial access paths.

By leaving out all relation-related operations, the database statement, on the one hand, is shortened and therefore more clearly arranged for the user, and, on the other hand, it is present in a form which is independent of the underlying data structure, which provides for advantages in terms of speed of creation and processing. By making use of the table of relations known for each data structure, the access path, which determines the order of access to the database, is computed and can either be used for the generation of an SQL statement or directly be used for processing.

The table of relations contains all relations corresponding to the data structure associated with the database queried and may furthermore contain freely generated relations.

One possible embodiment of the method according to the invention may consist in that, for the purpose of determining partial access paths, the table of relations is read into a graph based on the theory of graphs, and the partial access paths are computed using the thus formed graph. This means that the determination of the access path according to the invention can be carried out in a simple manner by applying a basically known technique.

A further mode of carrying out the invention may be to introduce relation-oriented operations in the database statement by means of the access path. The relation-oriented operations introduced may be such as to allow the conversion of the database statement, developed according to invention, into a valid SQL statement by means of a program, thereby sparing the user the effort of creating and entering the entire SQL database statement by him or herself, in particular when it comes to complex queries.

According to an alternative embodiment of the inventive method, the determined access path, which provides references to data tables step by step, may be separately indicated in the database statement, and for accessing the database, these references to the data tables are followed step by step. Here, the processable database statement and the determined access path are both used directly for the query.

In the case of different data structures, according to another embodiment of the invention, the conversion of a database statement which is valid for one data structure into one that is valid for another data structure may be achieved by
- eliminating, from a database statement for a first database having a first data structure associated therewith, the associated first relation-oriented operations,
- introducing second relation-oriented operations into the database statement which has been cleared of the first relations, said second relation-oriented operations corresponding to a second data structure which is associated with a second database,
- executing the query on the basis of the database statement which includes the second relation-oriented operations by determining the partial access paths, using the associated table of the second relations, and assembling them to obtain an access path.

For large-scale users in particular, this enables the cost-efficient merging of existing query statements for a particular data structure with statements for a different data structure.

All above-mentioned embodiments of the inventive method are similarly suited for implementing a relational database system comprising a computer system with a relational database, a data processing unit and a memory, said data processing unit working according to the inventive method.

Such a computer program may exist in any form, but in particular as a computer program product available on a computer-readable medium, such as floppy disk, CD or DVD, having computer program encoding means, wherein a computer is caused by the program to execute the method in order to create a data carrier or electronic carrier signal according to invention after the computer program has been loaded. However, it is also possible to have it as a computer program product which includes a computer program on an electronic carrier signal, wherein a computer is caused by the program to execute the method according to the invention after the computer program has been loaded.

The aim of the invention is therefore also achieved by providing a data carrier or, equivalently thereto, an electronic carrier signal to be read into a relational database system, wherein the database statement present on the data carrier is created without any relation-related operations by indicating the data tables to which the processing functions are to be applied and by indicating the order of the selected data tables according to which the processing is to be carried out, and wherein the data carrier contains an access path which concretely states the order of access to the database and which is determined by first computing a partial access path, via the table of relations, between each two subsequent, selected data tables on the basis of the relations which exist between the subsequent data tables, and then assembling the access path from all computed partial access paths.

A further embodiment of the inventive data carrier including database statements may consist in that an access path, determined according to the method of the invention, has already been introduced into the database statements and is used to control the database system through the database statement for accessing the relational database.

Alternatively, the data carrier intended to be read into a relational database system according to the invention may be such as to have the access path, which is used to control the database system through the database statement for accessing the relational database, indicated separately on the data carrier, with the access path providing references to data tables step by step and these references to the data tables being followed step by step in order to access the database.

Furthermore, the invention concerns a computer program having instructions which are adapted to execute the method according to the invention.

In addition, the invention relates to a computer program product having a computer-readable medium with computer program encoding means, wherein a computer is caused by the program to execute the method according to invention after the computer program has been loaded.

Lastly, the invention also relates to a computer program product having a computer program on an electronic carrier signal, wherein a computer is caused by the program to execute the method according to the invention after the computer program has been loaded.

The invention will now be explained in detail making reference to the exemplary applications which are illustrated in the drawings, in which.

The main tasks of a database system are to store and to manage data and to provide data through database queries.

The invention relates to relational database systems which enable access to data stored in a database by using a database language. In the exemplary embodiments shown, the widely employed database language SQL is used, however, the invention is not limited to use thereof.

Every relational database includes an associated data structure in the form of a plurality of data tables which are interconnected through relations. Data tables are to be understood as data organized in rows and columns as is illustrated hereafter by the exemplary Tables 1 to 10.

In this specification, the term "row relation" designates each row in a table, i.e. for Table 1 "companies" (company_ID, name, street, ZIP, city, no._of_staff) and for Table 2 "departments" (department_ID, company_#, department_name), for example. The links between two data tables via at least one key field, for example 1:1, 1:n, m:n; companies (company_ID) <->departments (company_#) are referred to as "relations". The column "company_ID" in the "companies" table (Table 1) is a primary key for which there can be any number of values in the "departments" table (Table 2) in the "company_#" column.

TABLE 1 companies

| company_ID | name | street | ZIP | city | no._of_staff |
|---|---|---|---|---|---|
| 1 | Bauer GmbH | Street 1 | 1010 | Wien | 59 |
| 2 | Müller GmbH | Street 2 | 1020 | Wien | 50 |
| 3 | Schneider GmbH | Street 3 | 2000 | Stockerau | 98 |
| 4 | Hannes OEG | Street 4 | 8750 | Fohnsdorf | 5 |
| ... | ... | ... | ... | ... | ... |

TABLE 2 departments

| department_ID | company_# | department_name |
|---|---|---|
| 1 | 1 | marketing |
| 2 | 1 | human resources |
| 3 | 1 | research |
| 4 | 2 | marketing |
| 5 | 2 | research |
| 6 | 3 | human resources |
| ... | ... | ... |

TABLE 3 contact_persons

| contact_person_ID | department_# | last_name | first_name |
|---|---|---|---|
| 1 | 1 | Geing | Josef |
| 2 | 1 | Umdau | Peter |
| 3 | 1 | Graf | Elli |
| 4 | 2 | Pleit | Hannes |
| 5 | 2 | Schön | Gerda |
| 6 | 3 | Toll | Maria |
| 7 | 4 | Stang | Peter |
| ... | ... | ... | ... |

TABLE 4 contacts

| contact_ID | contact_person_# | contact_date | conversation_content | established_by |
|---|---|---|---|---|
| 1 | 1 | Mar. 1, 2003 | callback requested | |
| 2 | 2 | May 2, 2002 | documents are important | |
| 3 | 3 | Jul. 4, 2004 | not available | |
| 4 | 6 | Feb. 13, 2003 | will get back to us | |
| 5 | 6 | Sep. 24, 2002 | showed great interest | |
| 6 | 2 | Dec. 8, 2004 | will come tomorrow at 2 p.m. | |
| 7 | 1 | Oct. 16, 2002 | currently no budget available | |
| 8 | 3 | Oct. 17, 2004 | has lost the documents | |
| 9 | 7 | Mar. 19, 2003 | always takes time if necessary | |
| ... | ... | ... | ... | ... |

TABLE 5 events

| event_ID | contact_person_# | event_date | no._of_persons |
|---|---|---|---|
| 1 | 1 | Jun. 1, 2004 | 3 |
| 2 | 1 | Sep. 1, 2004 | 5 |
| 3 | 2 | Jul. 3, 2004 | 6 |
| 4 | 3 | Jan. 9, 2003 | 81 |
| 5 | 1 | Dec. 2, 2003 | 8 |
| ... | ... | ... | ... |

TABLE 6 events_status

| status_ID | event_# | status_date | status_type_# | option_date |
|---|---|---|---|---|
| 1 | 1 | Jan. 1, 2004 | 1 | |
| 2 | 1 | Jan. 10, 2004 | 2 | Jan. 19, 2004 |
| 3 | 1 | Jan. 13, 2004 | 3 | |
| 4 | 2 | Apr. 6, 2004 | 2 | Apr. 18, 2004 |
| 5 | 2 | Jun. 8, 2004 | 4 | |
| 6 | 3 | Mar. 2, 2004 | 1 | |
| 7 | 4 | May 19, 2005 | 2 | Jun. 23, 2004 |
| 8 | 4 | Jun. 29, 2004 | 3 | |
| ... | ... | ... | ... | ... |

TABLE 7 additional_status_types

| status_type_ID | title |
|---|---|
| 1 | booked |
| 2 | option granted |
| 3 | paid |
| 4 | reminder sent |
| 5 | no show |
| 6 | postponed |
| ... | ... |

TABLE 8 invoices

| invoice_ID | event_# | invoice_date | invoice_# |
|---|---|---|---|
| 1 | 1 | Jul. 16, 2004 | 4 |
| 2 | 2 | Sep. 18, 2004 | 55 |
| 3 | 3 | Mar. 12, 2003 | 6 |
| 4 | 4 | Apr. 18, 2004 | 7 |
| 5 | 5 | Nov. 19, 2003 | 8 |

TABLE 8-continued

| invoices | | | |
|---|---|---|---|
| invoice_ID | event_# | invoice_date | invoice_# |
| 6 | 6 | Mar. 21, 2004 | 9 |
| 7 | 7 | Dec. 2, 2004 | 10 |
| ... | ... | ... | ... |

TABLE 9

| invoice_line_items | | | |
|---|---|---|---|
| invoice_line_item_ID | invoice_# | line_item_# | line_item_total |
| 1 | 1 | 1 | € 100.00 |
| 2 | 1 | 2 | € 12.00 |
| 3 | 1 | 3 | € 354.00 |
| 4 | 2 | 1 | € 6.00 |
| 5 | 2 | 3 | € 9.00 |
| 6 | 2 | 5 | € 98.00 |
| 7 | 3 | 6 | € 7.00 |
| 8 | 3 | 2 | € 6.00 |
| 9 | 4 | 1 | € 54.00 |
| 10 | 4 | 4 | € 456.00 |
| ... | ... | ... | ... |

TABLE 10

| additional_invoice_line_items_titles | |
|---|---|
| line_item_ID | line_item_title |
| 1 | set meals |
| 2 | food |
| 3 | beverages |
| 4 | music |
| 5 | decoration |
| 6 | venue rental |
| ... | ... |

For each data structure, a table of relations which contains all relations corresponding to the data structure associated with the database queried and optionally also freely generated relations is provided.

TABLE 11

Figure 1:
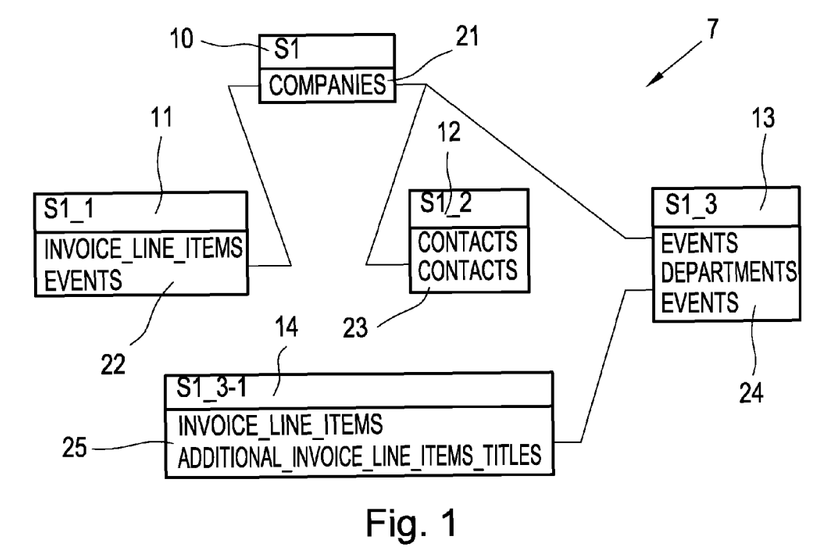
FIG. 1 is a schematic diagram of an ordered tree for the application of the inventive method to an example of a query (Example 1)

Table of Relations for FIG. 1

| From Table | From Column | To Table | To Column | Type of Relation |
|---|---|---|---|---|
| companies | company_ID | departments | company_# | 1:n |
| departments | department_ID | contact_persons | department_# | 1:n |
| contact_persons | contact_person_ID | contacts | contact_person_# | 1:n |
| contact_persons | contact_person_ID | events | contact_person_# | 1:n |
| events | event_ID | events_status | event_# | 1:n |
| additional_status_types | status_type_ID | events_status | status_type_# | 1:n |
| events | event_ID | invoices | event_# | 1:n |
| invoices | invoice_ID | invoice_line_items | invoice_# | 1:n |
| additional_invoice_line_items_titles | line_item_ID | invoice_line_items | line_item_# | 1:n |

For the above-mentioned data structure of the data tables 1 to 10 (Table 1 to 10), it is possible to formulate, for example, the following request which demonstrates how complex the problems may be that the method according to the invention is able to solve. The following example refers to the above data structure.

EXAMPLE 2

List all companies, including their this year's total event turnover, with which at least ten contacts have been established this year and whose marketing departments have booked at least three events in this year with more than 50 Euros turnover for food and beverages.

In the method according to the invention, it is substantially the following steps that are being executed:
1) Formulating a processable database statement without any relation-related operations
2) Determining an access path
In detail, this is carried out as follows:
ad 1) Indicating processing functions and data tables and their columns to which the processing functions are to be applied as well as the order and levels of hierarchy according to which the processing is to take place.

| SELECT | processing function |
|---|---|
| companies | data table to which the processing function is to be applied |
| all columns (.*) | columns to which the processing function is to be applied |

Indicating all columns of the "company" table
Determining the sum of all line item totals from the associated column of the "invoice_line_item" table, restricting this to the event year (i.e. this year)
Therefore, the creation of the database statement according to the invention results in:

SELECT companies.*,
    (SELECT SUM (invoice_line_items.line_item_total)
        WHERE (events.event_date=date.year) )
WHERE (SELECT COUNT(contacts.*)
        WHERE (contacts.contact_date=date.year)
)>= 10
AND (SELECT COUNT(events.*)
    WHERE (departments.department_name= „marketing")
    AND (SELECT SUM (invoice_line_items.line_item_total)
        WHERE
        (additional_invoice_line_items_titles.line_item_title -continued IN ("food", "beverages"))
) >50
AND (events.event_date = date.year )
) >=3

[here, "date.year" replaces BETWEEN 01-01 current year AND 12-31 current year]

This query contains only the tables to which the processing functions are to be applied, without any relations. Thereby, independence of any data structure is obtained, and at the same time, the length of notation is reduced, leading to increased clarity. For example, the usually formed Cartesian products which are restricted by relations are eliminated because the statement already contains all pieces of information which can be used in combination with the table of relations to determine an access path for the individual data structure, so that on the one hand, independence of the concrete data structure is given, and on the other hand, the entry of the query made by the user is shortened and limited to the essential, which in turn increases its clarity.

ad 2) Based on to the formulation of the problem to be solved, there appears a natural order of the data tables used as well as hierarchy levels in the query (statement), which are conditional on the sub-queries (SUBSELECT) to be processed and from which partial access paths are determined with the aid of the table of relations (Table 11) in order to generate an SQL statement for the respective data structure.

The above-mentioned order and levels of hierarchy of the data tables used are preferably represented in the form of an ordered tree 7 (FIG. 1) which includes a root 10 and nodes 11, 12, 13 and 14, with node 14 being a sub-node of node 13.

As its information field 21, the root 10 of the ordered tree 7 contains all names of the data tables of the superordinate query only, for example in the form of a list or an array which is conveniently in the same order as indicated in the statement and optionally without duplicate data table names. For the root 10, the information field 21 contains the data table COMPANIES (Table 1). Sub-queries (SUBSELECT) and their subordinate sub-queries (SUBSELECT in SUBSELECT) are subordinate to the root 10 and listed in the tree-structure as nodes 11, 12, 13, 14. The information fields 22, 23, 24, 25 of the nodes 11, 12, 13, 14 contain the names of the data tables associated with the sub-queries which have been formulated in the respective SUBSELECT clause, also preferably in the form of a list or array. For node 13, these are the data tables EVENTS (Table 5), DEPARTMENTS (Table 2) and EVENTS (Table 5) in its information field 24. According to the query formulation, the SUBSELECT clause of node 13 contains a further SUBSELECT, namely node 14, which, in turn, has the data tables INVOICE_LINE_ITEMS (Table 9) and ADDITIONAL_INVOICE_LINE_ITEMS_TITLES (Table 10) listed in its information field.

This tree 7 is run through in a pre-order run: root 10, node 11, node 12, node 13 and node 14.

As levels of hierarchy, the following can be represented:
Level 1: companies
root 10, superordinate query
Level 1.1: invoice_line_items, events
node 11, sub-query in the SELECT part of the main query
Level 1.2: contacts, contacts
node 12, sub-query in the WHERE part of the main query
Level 1.3: events, departments, events
node 13, sub-query in the AND part of the main query
Level 1.3.1: invoice_line_items, additional_invoice_line_items_titles
node 14, sub-query in the AND sub-query Next, the access path, which concretely prescribes the order of access of the database, is determined by computing a partial access path, via the table of relations, between each two subsequent, selected data tables on the basis of the relations which exist between the subsequent data tables, and assembling the access path from all computed partial access paths.

Note that due to the omission of all product descriptions in the statement (FROM part), the order of the data tables that has been formulated with the processing functions may lead to the double or multiple run-through of partial access paths, so that in the formation of a Cartesian product, the same data tables may erroneously be considered more than once, leading to a wrong result of the query.

By means of the access path, which has been determined using the table of relations shown above (Table 11), relation-oriented operations can now be introduced into the database statement formulated according to the invention (Example 2), producing the following SQL statement (the introduced operations are shown in italics) which can be processed by any database system supporting the SQL standard. One possible way of computing will be explained afterwards.

```
SELECT companies.*,
    (SELECT SUM (invoice_line_items.line_item_total)
     FROM departments, contact_persons, events, invoices, invoice_line_items
     WHERE (companies.company_ID=departments.company_#)
     AND (departments.department_ID=contact_persons.department_#)
     AND (contact_persons.contact_person_ID=events.contact_person_#)
     AND (events.event_ID=invoices.event_#)
     AND (invoices.invoice_ID=invoice_line_items.invoice_#)
     AND (events.event_date=date.year)
    )
FROM companies
WHERE (SELECT COUNT(contacts.*)
    FROM departments, contact_persons, contacts
    WHERE (companies.company_ID=departments.company_#)
    AND (departments.department_ID=contact_persons.department_#)
    AND (contact_persons.contact_person_ID=contacts.contact_person_#)
    AND (contacts.contact_date = date.year)
) >= 10
AND (SELECT COUNT(events.*)
    FROM departments, contact_persons, events
    WHERE (companies.company_ID=departments.company_#)
    AND (departments.department_ID=contact_persons.department_#)
    AND (contact_persons.contact_person_ID=events.contact_person_#)
    AND (departments.department_name="marketing")
    AND (SELECT SUM(invoice_line_items.line_item_total)
        FROM invoices, invoice_line_items, additional_invoice_line_items_titles
        WHERE (events.event_ID=invoices.event_#)
```

```
            AND (invoices.invoice_ID=invoice_line_items.invoice_#)
            AND(invoice_line_items.line_item_#=additional_invoice_line_items_titles.line_item_ID)
            AND (additional_line_items_titles.line_item_title
                IN („food","beverages") )
            ) > 50)
            AND (events.event_date=date.year)
) >= 3
```

The length of the statement obtained this way compared to the length of the one that has been formulated in step 1) clearly demonstrates the advantages that can be obtained in terms of shortness and clarity and particularly in terms of independence of the data structure.

If the statement is stored as a query, the inventive notation and the generated notation can be used as such, re-computation no longer being necessary. A re-computation will only be carried out if the data structure and/or the statement itself is changed or modified. Thereby, the short period of time for the conversion into an SQL statement is eliminated. Further optimizations will be appreciated by those skilled in the art.

Another possibility is to separately indicate the determined access path, which provides references to data tables step by step, in the database statement, and to follow these references to the data tables step by step in order to access the database. This yields, for example:

```
WAY companies
    -> departments WHERE (companies.company_ID=departments.company_#)
    -> contact_persons WHERE (departments.department_ID=contact_persons.department_#)
    -> events
    WHERE (contact_persons.contact_person_ID=events.contact_person_#)
    -> invoices WHERE (events.event_ID=invoices.event_#)
    -> invoice_line_items
    WHERE (invoices.invoice_ID=invoice_line_items.invoice_#)
    -> additional_invoice_line_items_titles
    WHERE (invoice_line_items.line_item_#= additional_invoice_line_items_titles.line_item_ID)
    contact_persons -> contacts
    WHERE (contact_persons.contact_person_ID=contacts.contact_person_#)
SELECT companies.*,
    (SELECT SUM (invoice_line_items.line_item_total)
        WHERE (events.event_date=date.year) )
WHERE (SELECT COUNT(contacts.*)
        WHERE (contacts.contact_date=date.year)
)> = 10
AND (SELECT COUNT(events.*)
        WHERE (departments.department_name= „marketing")
        AND (SELECT SUM (invoice_line_items.line_item_total)
            WHERE (additional_invoice_line_items_titles.line_item_title
                IN ("food", "beverages"))
        ) >50
        AND (events.event_date = date.year )
) >=3
```

By this, the introduction into the statement is eliminated, and the access path provides step-by-step reference to the data tables. When accessing the database, these references are followed step by step.

One possible algorithm for determining the access path by means of an ordered tree as depicted in FIG. 1 will now be explained, making reference to a simple data structure in order to provide for the better understanding without the distraction of table names and the like. Note, however, that the algorithm mentioned hereunder is only one amongst many that may be used for the calculation.

In general, when determining the overall access path, doubly listed partial paths are deleted.

For example, the data tables provided are A, B, C, D, E, F, G, H.

The information field of a root of the ordered tree contains, for example: A, C, F, B.

This results in the following partial paths:
partial path AC: A B C
partial path CF: C D E F
partial path FB: F E D C B
The unadjusted overall access path is therefore: A B C D E F E D C B As can be seen, E D C B are present twice and will accordingly be deleted.

The correct overall access path is therefore: A B C D E F

Figure 2:
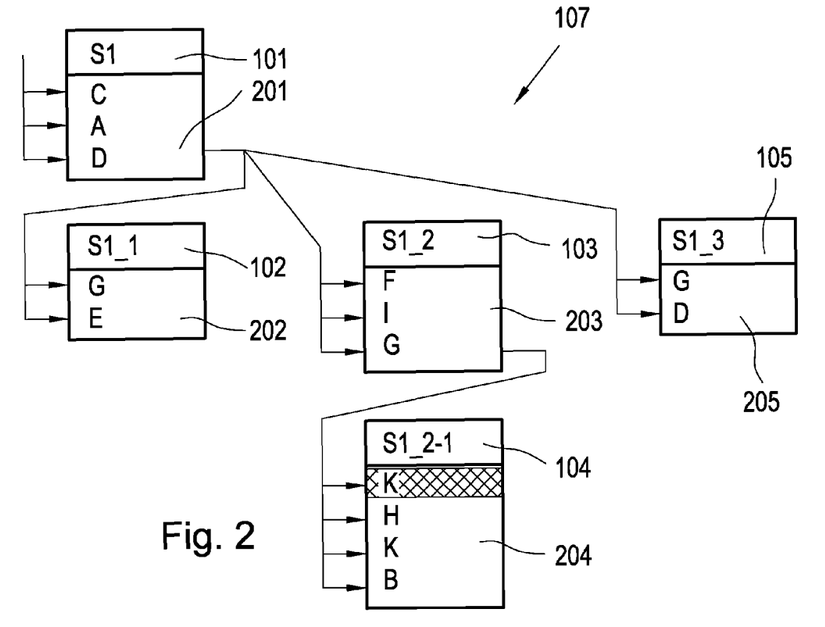
FIG. 2 is a schematic diagram of an ordered tree for the determination of the access path by means of the inventive method in another example of a query (Example 2)

Assuming the existence of a tree representation as shown in FIG. 2, one of many possibilities of how to calculate the access path according to the inventive method and translate it into a SQL statement by carrying out the following steps will be described.

A data structure contains data tables A, B, C, D, E, . . . .

According to the query on which the representation of FIG. 2 is based and which, for reasons of clarity, remains unspecified, the following tree structure is obtained.

Root (node) 101 with information field 201 containing C, A, D

Node 102 with information field 202 containing G, E

Node 103 with information field 203 containing F, I, G

Node 104 with information field 204 containing K, H, K, B

Node 105 with information field 205 containing G, D

The table of relations which belongs to the data structure chosen links, for a less complex representation here in a simplified manner, all alphabetically subsequent data tables via a respective common relation field, i.e. A<->B, B<->C, C<->D . . . As can be seen from Table 12 (table of relations), the following relation fields are being assumed:
table A columns a, z1
table B columns b, a1
table C columns c, b1
table D columns d, c1

TABLE 12

Table of Relations for FIG. 2

| From Table | From Column | To Table | To Column | Type of Relation |
|---|---|---|---|---|
| A | a | B | a1 | 1:n |
| B | b | C | b1 | 1:n |
| C | c | D | c1 | 1:n |
| D | d | E | d1 | 1:n |
| ... | ... | ... | ... | 1:n |
| ... | | | | |
| ... | | | | |

The ordered tree that has been created for a given query is run through according to a so-called pre-order by going through all nodes, starting with the first node, i.e. root 101, of the ordered tree 107, followed by all other nodes 102, 103, 104, 105 according to their hierarchy level.

| | |
|---|---|
| Level 1: root (node) 10 | C, A, D |
| Level 1.1: node 102 | E, G |
| Level 1.2: node 103 | F, I, G |
| Level 1.2.1: node 104 | K, H, K, B |
| Level 1.3: node 105 | G, D |

As mentioned before, FIG. 2 shows the representation of a tree of a query that is not specified in detail. The root 101 (top node) contains in its information field 201 a list or array or the like of all names of the data tables that are present in the hierarchy level 1 of the superordinate query; as described above, only the data tables to which the processing functions are to be applied have been indicated in this non-specified query. The order of the indicated data tables is C, A, D.

In the next hierarchy level 1.1, one node 102, 103, 104 has been created for each sub-query of the superordinate query, each containing the data table names used in the respective sub-query in the form of a list, array or the like as its information field 202, 203, 205, respectively. The order for 102 is, for example, G, E, and for 103, for example, F, I, G, etc.

Hierarchy level 1.2.1 represents the sub-query of the sub-query 1.2 (node 103) and contains, as its information field 204, the data table names K, H, K, B used for it.

Within each node, starting with the root 101, the list of data table names, for instance the data tables C, A, D in the information field 201, are run through, and partial access paths are computed for each two subsequent data tables in the list, avoiding multiple run-throughs, as has already been described above, in order prevent unnecessary product formations which would lead to a wrong product.

Note that a node which lies directly under another node is termed the (direct) successor of this node. Accordingly, the other node is called direct predecessor.

After the entire list of the information field of a node has been run through, the next node in the pre-order is identified.

The partial access path between the first data table of the list of the information field of this next node and the last data table of the list of the information field of its direct predecessor is determined, then the list of said next node is run through to the last data table, as has been described above. For example, node 104;

run-through of the list of data tables in the information field 204:

K, H, K, B.

According to the pre-order, the next node is node 105, but as the direct predecessor of this node 105 is node 101, the link between G (node 105) and D (node 101) is identified and the partial access path computed. This is followed by the run-through of the data tables G,D in the information field 205 of node 105 of the tree 107.

As mentioned before, duplicate partial access paths are eliminated after or during the run-through of each node, so all doubly or multiply appearing data table names and relation information for the respective node or one of its predecessors, including the root, are discarded.

The calculation of the each partial access path is carried out, for example, as follows.

First, the table of relations (Table 12) is, for example, read into a graph, with the edges of the graph each containing also the relation conditions in order to determine, through the relations, links between two data tables, using the theory of graphs.

Therefore, for level 1, the path between A and C obtained in the first step C ->A as the result of the calculation of, for example, the shortest way, is the following list:

| Tables | | Relation Conditions | |
|---|---|---|---|
| C | B | b1 | b |
| B | A | a1 | a |

Next is A ->D, the path being A, B, C, D

| Tables | | Relation Conditions | |
|---|---|---|---|
| A | B | a | a1 |
| B | C | b | b1 |
| C | D | c | c1 |

With this, the run-through of the list in the information field 201 of the first node 101 is completed, what follows now is the adjustment, i.e. the elimination of rows of identical values, then the result is converted into a string and introduced into the SQL statement at the proper location (AFTER SELECT and BEFORE WHERE).

For level 1, the following string is obtained:

FROM A, B, C, D

WHERE (A.a=B.a1) AND (B.b=C.b1) AND (C.c=D.c1)

With this, the end of the list of current node, in this case of the root, has been reached. The next step is to determine whether there are any predecessor nodes or not. For the root, this is, by definition, not the case.

Summing up, the following steps are executed:

```
Information field 201 of node 101
C -> A
A -> D
    results in:   FROM A, B, C, D
                  WHERE (A.a = B.a1) AND (B.b = C.b1)
                  AND (C.c = D.c1)
Next node: 102, predecessor node: 101
first data table of current node and last data table of predecessor node
D -> G
run-through of list
G -> E
    results in:   FROM E, F, G
                  WHERE (D.d = E.d1) AND (E.e = F.e1)
                  AND (F.f = G.f1)
Next node: 103, predecessor node: 101
first data table of current node and last data table of predecessor node
D -> F
run-through of list
F -> I
I -> G
    results in:   FROM E, F, G, H, I
                  WHERE (D.d = E.d1) AND (E.e = F.e1) AND
                  (F.f = G.f1) AND (G.g = H.g1) AND
(H.h = I.h1)
Next node: 104, predecessor node: 103
first data table of current node and last data table of predecessor node
G -> K
run-through of list
K -> H
H -> K
K -> B
    results in:   FROM J, K
                  WHERE (I.i = J.i1) AND (J.j = K.j1)
Next node: 105, predecessor node: 101
first data table of current node and last data table of predecessor node
D -> G
run-through of list
G -> D
    results in:   FROM E, F, G
                  WHERE (D.d = E.d1) AND (E.e = F.e1) AND
                  (F.f = G.f1)
```

An application of the method according to the invention could consist in that for an existing data structure, several different statements exist which are not applicable for another data structure, because of different relations that exist between the data tables. In practice, this problem is often encountered in company mergers, or when converting data in the course of the change form one program provider to another, or when changing data structures because of decreased speeds.

As the invention enables the formulation of a data statement without reference to a particular data structure, the following procedure becomes possible.

From a database statement for a first database having a first data structure associated therewith, the associated first relation-oriented operations are eliminated.

Next, second relation-oriented operations, corresponding to a second data structure which is associated with a second database, are introduced into the database statement which has been cleared of the first relation-oriented operations.

Now, the query can be executed on the basis of the database statement which includes the second relation-oriented operations by determining the partial access paths, using the associated table of the second relations, and assembling them to obtain an access path.

```
SELECT A.*
FROM A
WHERE (     (SELECT COUNT(C.*)
             FROM B, C
             WHERE (A.a = B.a1)
             AND (B.b = C.b1)
             AND (C.field1 = 100)
) > 20)
AND (A.field1 = 40)
Eliminate: FROM A
Eliminate: FROM B, C
    and thus all relations A - B and B - C and A - C found in the table of
    relations, therefore A.a = B.b1 and B.b = C.b1
```

As the inventive statement, there remains:

```
SELECT A.*
WHERE (     (SELECT COUNT(C.*)
             WHERE (C.field1 = 100)
) > 20)
AND (A.field1 = 40)
```

Figure 3:
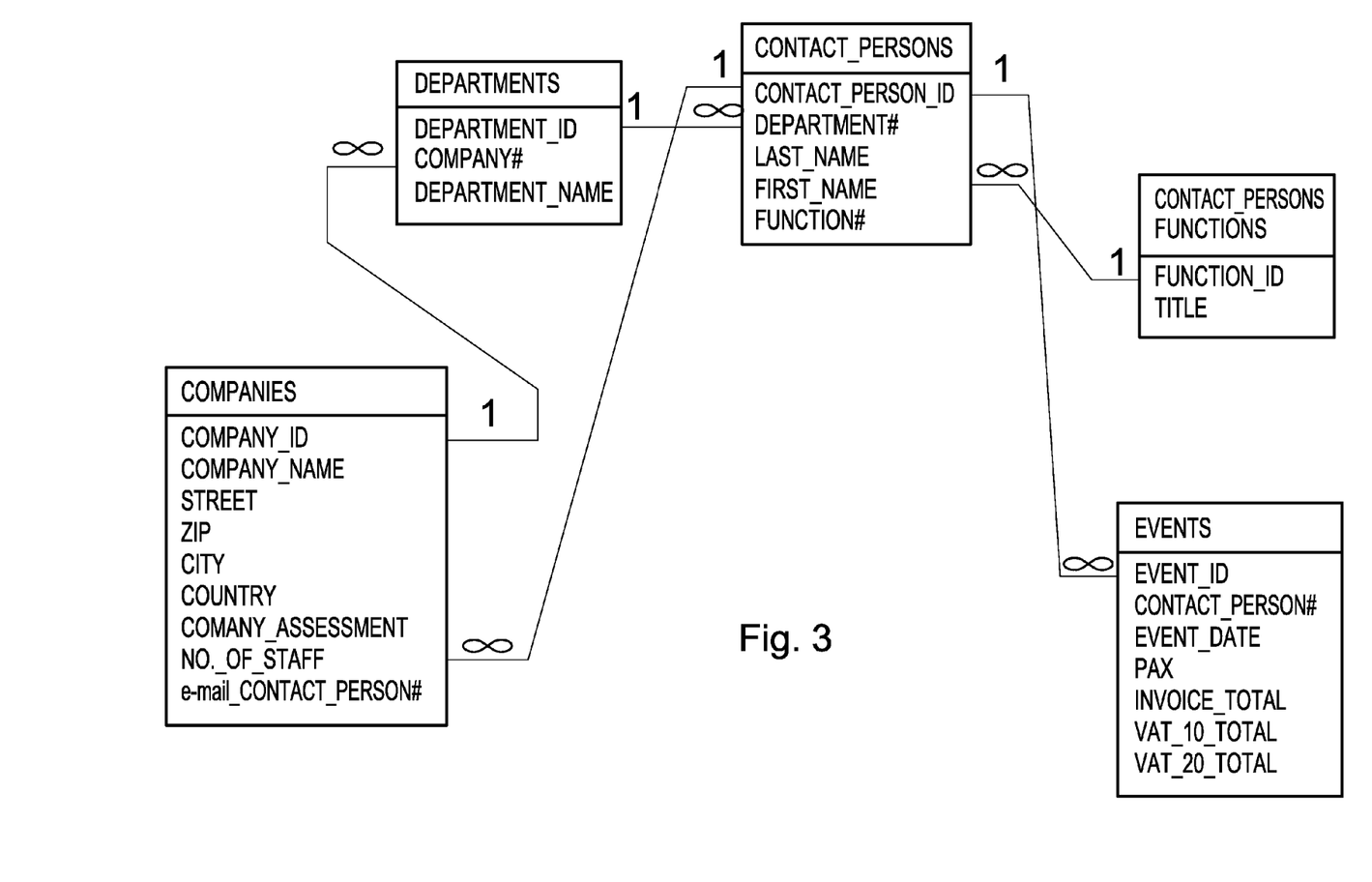
FIG. 3 is a schematic diagram of an exemplary table of relations for a first data structure.

The inventive method can be applied to this statement using a new table of relations. In order to illustrate the influence of the data structure on the data statement, FIGS. 3 and 4 show schematic diagrams of other two different tables of relations for a data structure 3 and a data structure 4, respectively, on which the same query is to be executed.

Figure 4:
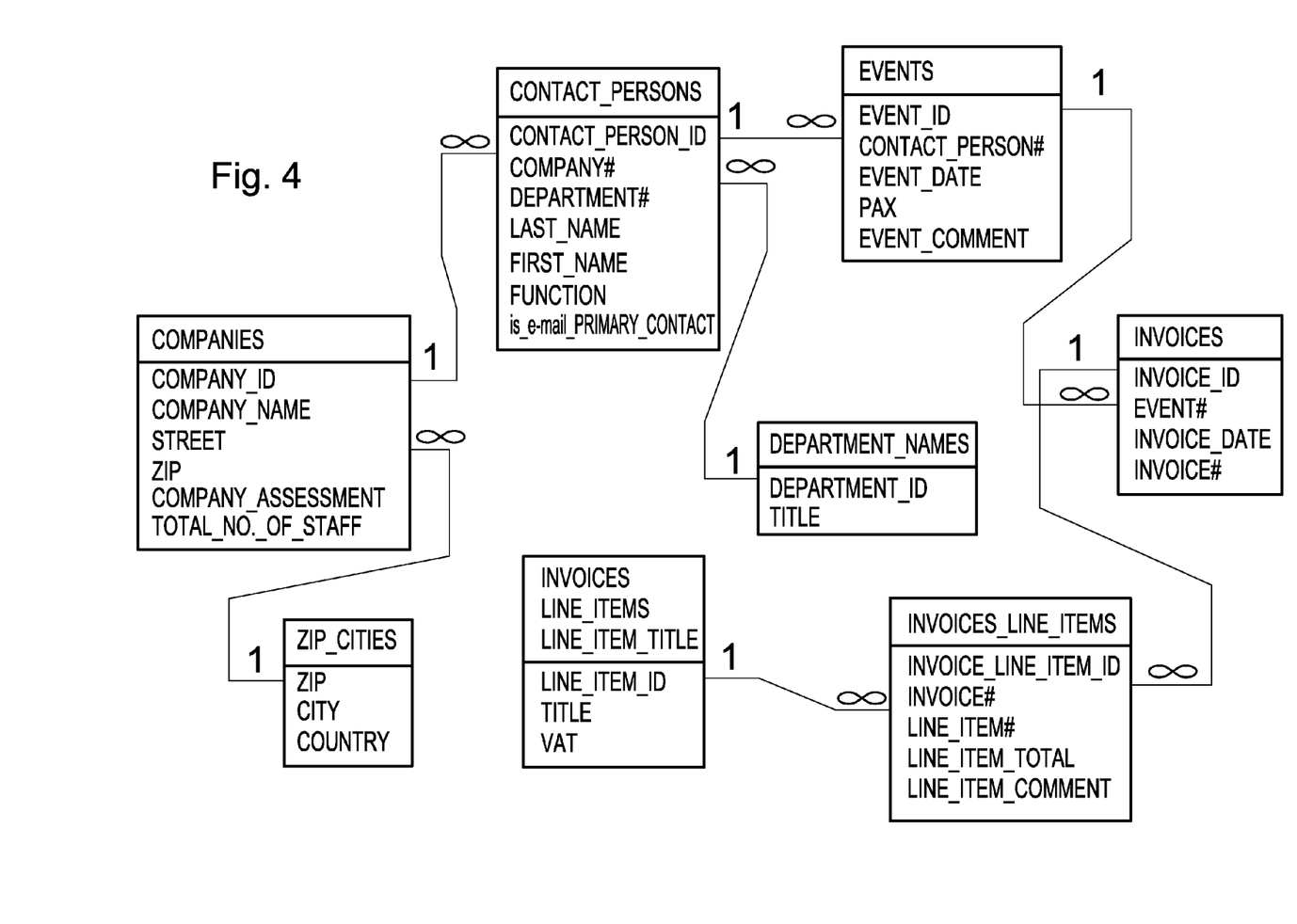
FIG. 4 is a schematic diagram of an exemplary table of relations for a second data structure.
Figure 5:
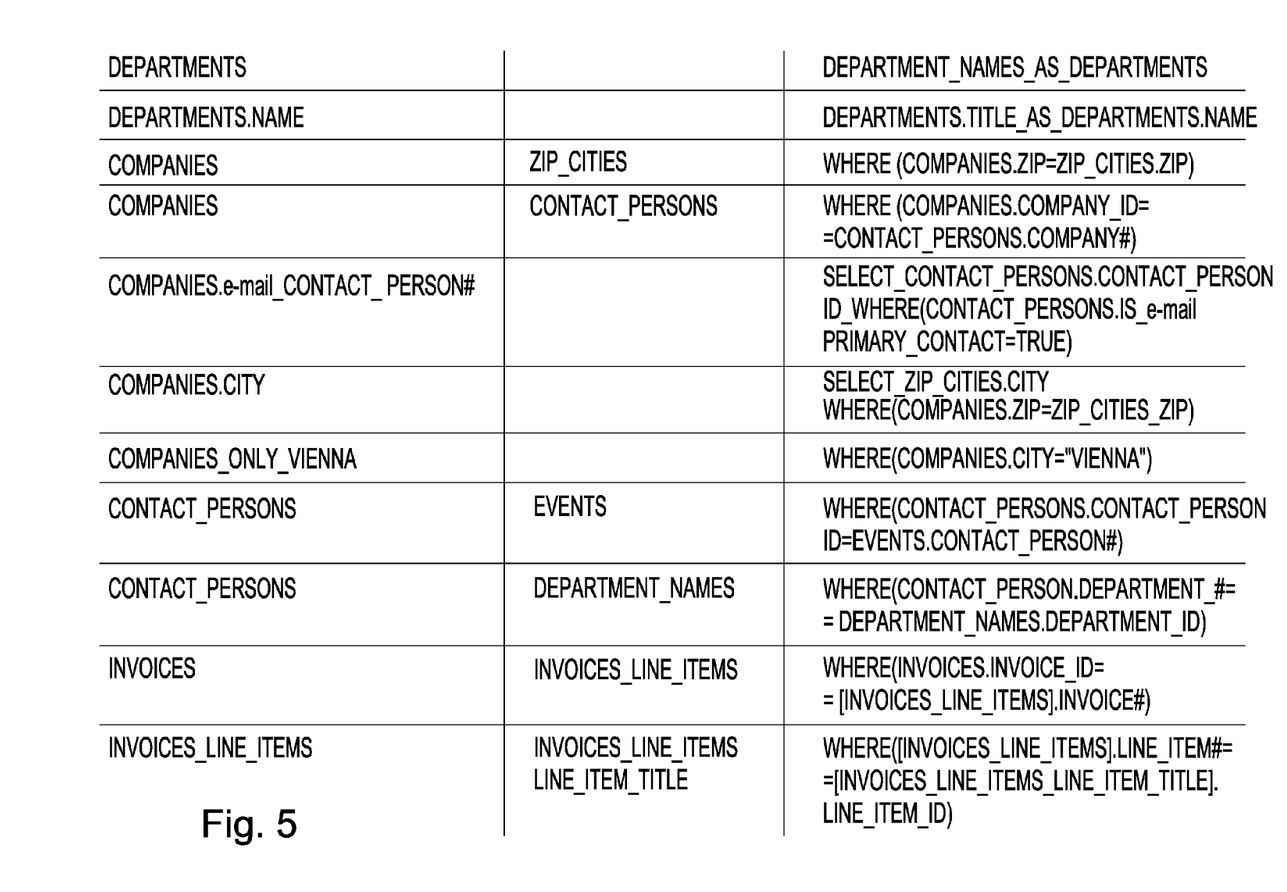
FIG. 5 is an extended table of relations for another example for the application of the inventive method.

In FIG. 5, the table of relations for the data structure 4 of FIG. 4 is shown in extended form. In addition to the usual relations between data tables, the column at the right-hand side contains freely allocatable names or macro-codes which, upon call, can be set or executed instead of the data tables in left column. In the context of the principle of the invention, this enables even further independence of the data structure, as it is possible to calculate table names and table fields or give them other names.

Extended table of relations for data structure 4 in FIG. 5.:

Here, alias names for data tables and alias names for data fields as well as information regarding the partitioning of tables, such as companies.city, are indicated.

EXAMPLE 3

All companies with at least 3 contact persons in the marketing department

First, for an exemplary application according to the invention, the data tables and processing functions that are necessary according to the query are indicated.

```
SELECT companies.*
WHERE (
    (SELECT COUNT(contact_persons.*)
    WHERE (department.name = „marketing") )
>= 3)
```

The execution of the inventive methods yields different SQL statements for data structure 3 and data structure 4, respectively.

For data structure 3:

```
SELECT companies.*
FROM companies
WHERE (
    (SELECT COUNT(*)
    FROM departments, contact_persons
    WHERE (companies.company_ID=departments.company_#)
      AND
      (departments.department_ID=contact_persons.department_#)
      AND (departments.name="marketing")
    )
    >= 3)
```

For data structure 4:

```
SELECT companies.*
FROM companies
WHERE (
    (SELECT COUNT(*)
    FROM contact_persons, department_names
    WHERE (companies. company_ID=contact_persons.company_#)
      AND (contact_persons.department_#=
      department_names.department_ID)
      AND (department_names.title="marketing")
    )
    >= 3)
```

The invention claimed is:

1. A method for controlling a relational database system, the method comprising the steps of:
   executing a database query in a relational database which contains, as an associated data structure, a plurality of data tables interconnected through relations, by using a database language, and with a table of the relations being provided;
   creating a database statement, which does not contain any relation-related operations;
   determining an access path, which concretely states an order of access to the relational database,
   wherein the database statement created contains only processing functions, data tables and columns of the data tables to which the processing functions are to be applied as well as order and levels of hierarchy of the data tables according to which processing the query is to take place, wherein the order and levels of hierarchy of the data tables used are represented in form of an ordered tree, and root of the ordered tree contains all names of the data tables of the database query only, and subordinate sub-queries are subordinate to the root and listed in the tree-structure as nodes, which contain names of the data tables associated with the sub-queries,
   wherein in the table of relations, the relations are indicated as links between two data tables each via at least one key field,
   wherein the access path is determined by first computing a partial access path, via the table of relations, between each two subsequent, selected data tables on the basis of the relations which exist between each two subsequent, selected data tables, and then assembling the access path from all computed partial access paths; and
   producing a SQL statement which can be processed by any database system supporting the SQL standard by introducing into the database statement relation-oriented operations by means of the access path, which has been determined using the table of relations.

2. The method according to claim 1, wherein said table of relations contains all relations corresponding to a data structure associated with the relational database queried.

3. The method according to claim 1 or claim 2, wherein for the purpose of determining said partial access paths, said table of relations is read into a graph and said partial access paths are computed using the thus formed graph.

4. The method according to claim 2, wherein said table of relations further contains freely generated relations.

5. The method according to claim 1 or 2, wherein said determined access path provides step by step references to the data tables, and said references to the data tables are followed step by step for accessing the relational database.

6. The method according to claim 5, wherein said determined access path is separately indicated in the database statement.

7. The method according to any one of claims 1 and 2, wherein said relational database is a first relational database of a plurality of relational databases, said first relational database has associated therewith a first data structure and first relation-oriented operations, wherein said plurality of relational databases further includes at least a second relational database having associated therewith a second data structure and second relation-oriented operations, wherein a database statement for the first relational database is formed when the first relation-oriented operations are introduced into the database statement, the method further comprising the steps of:
   eliminating the associated first relation-oriented operations from the database statement for the first relational database; and
   introducing the second relation-oriented operations into said database statement which has been cleared of said first relation-oriented operations to obtain a database statement for the second relational database, said second relation-oriented operations corresponding to the second data structure which is associated with the second relational database, wherein the query is executed on the basis of said database statement for the second relational database which includes said second relation-oriented operations by determining the partial access paths using an associated table of the second relation-oriented operations, and assembling the partial access paths to obtain an access path for use with the second relational database.

8. A relational database system comprising a computer system with a relational database, a data processing unit and a memory, said data processing unit working according to the method for controlling a relational database system of any one of claims 1 and 2.

9. A relational database system operating according to the method for controlling a relational database system of any one of claims 1 and 2, the relational database system comprising:
   a computer system with a relational database, a data processing unit and a memory; and
   a data carrier communicating data to said computer system, said data carrier communicates the database statement formulated in the database language to said computer system, wherein the database statement present on the data carrier is without any relation-related operations, indicates the data tables to which the processing functions are to be applied and indicates the order of the selected data tables according to which the processing of the query is to be carried out, and wherein said data carrier contains the access path which concretely states the order of access to the database.

10. The relational database system according to claim 9, wherein said database statement carried on said data carrier includes the access path.

11. The relational database system according to claim 9, wherein said access path is carried separately from said database statement on said data carrier, with said access path providing step by step references to data tables and said references to the data tables being followed step by step in order to access the relational database.

12. A computer program product including a non-transitory computer-readable storage medium with encoding means carrying a computer program encoded thereby, wherein a computer is caused by the computer program to execute the method according to any one of claims 1 and 2 after the computer program has been loaded into the computer.

* * * * *